United States Patent
Ito

(10) Patent No.: US 7,832,915 B2
(45) Date of Patent: Nov. 16, 2010

(54) SURFACE LIGHT SOURCE DEVICE AND IMAGE DISPLAY UNIT

(75) Inventor: Atsushi Ito, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/268,757

(22) Filed: Nov. 11, 2008

(65) Prior Publication Data

US 2009/0122518 A1    May 14, 2009

(30) Foreign Application Priority Data

Nov. 14, 2007   (JP) .......................... P2007-295747

(51) Int. Cl.
*F21V 7/04* (2006.01)
(52) U.S. Cl. ...................... 362/613; 362/614; 362/97.3; 349/62
(58) Field of Classification Search ............... 362/33, 362/97.1, 97.2, 97.3, 97.4, 330–340, 561, 362/153.1, 612, 613, 614, 618.8; 40/541, 40/542, 564, 565, 570; 349/58, 61, 62, 70
See application file for complete search history.

(56) References Cited

U.S. PATENT DOCUMENTS

| | | | |
|---|---|---|---|
| 5,161,041 | A | 11/1992 | Abileah et al. |
| 7,213,933 | B2 | 5/2007 | Chang et al. |
| 7,478,913 | B2 | 1/2009 | Epstein et al. |
| 2005/0128376 | A1 | 6/2005 | Li et al. |
| 2006/0232964 | A1 | 10/2006 | Hoshi et al. |
| 2007/0002554 | A1 | 1/2007 | Lim |
| 2008/0193731 | A1 | 8/2008 | Laney et al. |
| 2009/0073723 | A1 | 3/2009 | Hsu et al. |

FOREIGN PATENT DOCUMENTS

| | | |
|---|---|---|
| JP | 63-110422 | 5/1988 |
| JP | 2000-040412 | 2/2000 |
| JP | 2003-140110 | 5/2003 |
| JP | 2004-139876 | 5/2004 |
| JP | 2004-178850 | 6/2004 |
| JP | 2005-031379 | 2/2005 |
| JP | 2005-142164 | 6/2005 |
| JP | 2007-294295 | 11/2007 |

*Primary Examiner*—Hargobind S Sawhney
(74) *Attorney, Agent, or Firm*—Finnegan, Henderson, Farabow, Garrett & Dunner, L.L.P.

(57) ABSTRACT

A surface light source device includes a first light source disposed so as to face a reflecting surface of a reflecting member, a second light source having spectrum selectivity different from that of the first light source, a light diffusing member configured to diffuse light rays emitted from the first and second light sources, and a transparent light control member disposed between the first light source and the light diffusing member so as to face the first light source and the light diffusing member. The light control member directs the light rays emitted from the first and second light sources in predetermined directions. The second light source faces an outer peripheral surface of the light control member. The light ray emitted from the second light source is directed by the light control member inside the light control member so as to be output towards the light diffusing member.

8 Claims, 12 Drawing Sheets

SURFACE LIGHT SOURCE DEVICE AND IMAGE DISPLAY UNIT

CROSS REFERENCES TO RELATED APPLICATIONS

The present invention contains subject matter related to Japanese Patent Application JP 2007-295747 filed in the Japanese Patent Office on Nov. 14, 2007, the entire contents of which are incorporated herein by reference.

BACKGROUND OF THE INVENTION

1. Field of the Invention

The present invention relates to a surface light source device and an image display unit and, in particular, to a technology for reducing the thickness of each of a surface light source device and an image display unit and improving the functionality thereof by disposing first and second light sources at predetermined locations relative to a light control member.

2. Description of the Related Art

Recently, surface light source devices that illuminate using a cold cathode fluorescent lamp (CCFL) or a light emitting diode (LED) have been widely used. For example, such surface light source devices are used for lighting equipment that employs a light source for direct lighting. In addition, the surface light source devices are used for image display units that employ a light source for backlighting (e.g., television receivers and personal computers).

A liquid crystal display unit is one of such image display units. A liquid crystal display unit includes, for example, a liquid crystal panel that displays an image thereon.

In a liquid crystal display unit, since a liquid crystal panel is not a light-emitting device, a surface light source device is provided. The surface light source device includes a light source that emits light from the back side of the liquid crystal panel. Accordingly, the surface light source device is used for a backlight device that emits light to a liquid crystal panel from the back side of the liquid crystal panel.

Surface light source devices can be categorized into two types: a side edge type and a direct light type. Surface light source devices of a side edge type include a light guiding member. A light source is disposed on the side of the light guiding member. Light emitted from the light source is directed by the light guiding member towards a display panel placed in a predetermined direction. In contrast, in surface light source devices of a direct light type, a light source is disposed on the back side of a display panel. Light is directly emitted from the light source to the display panel.

For liquid crystal display units used for television receivers and large-screen liquid crystal display units, surface light source devices of a direct light type are used in order to obtain a bright image and maintain a bright screen for a long time.

In general, surface light source devices used for liquid crystal display units include a light diffusing member (a light diffusing plate or a light diffusing sheet) disposed so as to face the back surface of a liquid crystal panel and a light reflecting member disposed on the back side of the light diffusing member.

For example, a surface light source device include a plurality of fluorescent lamps (e.g., CCFLs) serving as a light source. The fluorescent lamps are arranged in a predetermined direction. A light diffusing member is disposed between a display panel and the fluorescent lamps. The light diffusing member diffuses light emitted from the fluorescent lamps so that the display panel is uniformly illuminated with the light. Thus, users do not visually recognize the external shapes of the fluorescent lamps, and therefore, the presence of the fluorescent lamps.

In addition, the light diffusing member uniformly emits light output from the light source to the liquid crystal panel. In this way, the luminance of the display screen of the liquid crystal panel can be maintained uniform.

In the liquid crystal display units, after light is emitted from a light source, the emitted light is diffused by the light diffusing member and is emitted to a liquid crystal panel that displays an image from the back side of the liquid crystal panel. At that time, the light is emitted from the light source towards the light reflecting member as well as towards the light diffusing member. The light emitted towards the light reflecting member is reflected by the light reflecting member and is then made incident on the light diffusing member. Thereafter, the light is diffused by the light diffusing member, and the diffuse light is emitted to the liquid crystal panel.

An example of an existing image display unit, including a surface light source device serving as a backlight device of a direct light type, is described next with reference to FIG. 13.

An image display unit a includes a casing (not shown). A variety of associated components are disposed inside the casing.

The casing has a box-like shape having a small thickness in the forward-backward direction. The casing has an opening on the front side thereof. A display panel b is disposed inside the casing so as to close the opening. A driving circuit c is disposed, for example, beneath the display panel b and is electrically connected to the display panel b. The driving circuit c drives and controls the display panel b.

A surface light source device d is disposed inside the casing. The surface light source device d includes a light reflecting member e, fluorescent lamps f, f, . . . , and a light diffusing member g in this order from the back side.

For example, the light reflecting member e is formed from a white or silver resin or metal.

For example, the fluorescent lamps f, f, . . . are arranged at equal intervals in the vertical direction. The fluorescent lamps f, f, . . . are CCFLs, for example. Each of the fluorescent lamps f, f, . . . has a horizontally long cylinder shape. Each of the fluorescent lamps f, f, . . . includes a glass tube having a discharge space therein. A discharge medium is enclosed inside the glass tube.

The light diffusing member g diffuses light rays emitted from the fluorescent lamps f, f, . . . and emits the diffuse light rays to the display panel b. For example, the light diffusing member g is formed from a diffusing plate or a diffusing sheet. For example, the material of the light diffusing member g is a transparent or translucent white resin. More specifically, the material of the light diffusing member g may be a glass, a mixture of two mutually immiscible types of resin, a transparent resin containing a light diffusing material dispersed therein, or a transparent resin. The light diffusing member g has a light entrance surface and a light exit surface. The light entrance surface allows light rays emitted from the fluorescent lamps f, f, . . . to enter therethrough. The light exit surface diffuses the light rays entering through the light entrance surface and emits the diffuse light.

In recent years, the demand for reducing the thickness of such image display units has been increasing. However, if the distance between a light diffusing member and fluorescent lamps is decreased in order to reduce the thickness of the image display unit, the functionality of the light diffusing member is degraded, and therefore, the presence of the fluorescent lamps may be recognized in the form of the shapes of individual lamps by the users.

Therefore, some existing image display units provide a thin plate-like light control member called a "prism array" between a light source and a light diffusing member so as to increase the light diffusing function thereof. In this way, the presence of the fluorescent lamps is rarely recognized in the form of the shapes of individual lamps by the users (refer to, for example, Japanese Unexamined Patent Application Publication No. 63-110422).

In addition, a demand for increasing the performance of image display units (e.g., the image quality) has been increasing. In order to improve the performance of image display units, some existing image display units have a second light source, having a characteristic different from that of a fluorescent lamp, between fluorescent lamps. An example of the second light source is an LED (refer to, for example, Japanese Unexamined Patent Application Publication No. 2004-139876).

In the image display unit described in Japanese Unexamined Patent Application Publication No. 2004-139876, an LED that is usable at low power is used for a dark screen. In contrast, a fluorescent lamp is used for a bright screen while high power is being provided to the fluorescent lamp. In this way, a wide light control range is obtained, and therefore, the performance can be improved at low cost. In addition, since the wavelengths of light rays emitted from the fluorescent lamp and the LED are different, the color control range can be increased.

SUMMARY OF THE INVENTION

However, as in the above-described existing image display units, if an LED is disposed between fluorescent lamps, the LED absorbs light. Therefore, the use efficiency of light decreases. Thus, the performance of the image display units is decreased, which is problematic.

In addition, an LED is disposed between every two neighboring fluorescent lamps among a plurality of fluorescent lamps. Accordingly, a power feeding line connected to each of the LEDs is disposed on the back surface side of the fluorescent lamps. This prevents the thickness of the image display unit from being reduced, which is problematic.

Accordingly, the present invention provides a surface light source device and an image display unit that solve the above-described problems, that is, a surface light source device and an image display unit having a reduced thickness and an improved performance.

According to an embodiment of the present invention, a surface light source device includes at least one first light source disposed so as to face a reflecting surface of a light reflecting member, a second light source having spectrum selectivity different from that of the first light source, a light diffusing member configured to diffuse light rays emitted from the first and second light sources, and a light control member formed from a transparent material and disposed between the first light source and the light diffusing member so as to face the first light source and the light diffusing member. The light control member directs each of the light rays emitted from the first light source and the second light source in a predetermined direction. The second light source is disposed so as to face an outer peripheral surface of the light control member, and the light ray emitted from the second light source is directed by the light control member inside the light control member so as to be output towards the light diffusing member.

Accordingly, in the surface light source device, a light ray emitted from the second light source is directed by the light control member so as to be emitted towards the light diffusing member together with the light ray emitted from the first light source.

A plurality of the first light sources can be arranged in a predetermined direction, and a surface of the light control member facing the light diffusing member can have a first irregularity pattern in which a plurality of convex portions are continuously arranged in the direction in which the plurality of first light sources are arranged, and the convex portion can have one of a substantially triangular shape in cross section and a parabolic outer shape.

The thickness of the light diffusing member can be less than a thickness of the light control member in order to prevent the occurrence of abnormal noise caused by contact between the light diffusing member and the light control member.

The second light source can be formed from one of a light-emitting diode, an electroluminescence device, and a cold cathode fluorescent lamp.

A plurality of the first light sources can be arranged in a predetermined direction, and a surface of the light control member facing the first light sources can have a second irregularity pattern in which a plurality of concave portions are continuously or separately arranged in a direction perpendicular to the direction in which the plurality of first light sources are arranged. Each of the concave portions can be formed from a first slope surface and a second slope surface each inclined with respect to a plane that is perpendicular to an optical axis of the light ray emitted from the first light source to the light control member.

The transparent material of the light control member can be one of acrylate, polycarbonate, polystyrene, and glass.

The light control member can have ultraviolet light inhibiting properties with respect to the light rays emitted from the first light source and the second light source. Thus, deterioration of the light control member can be prevented.

According to another embodiment of the present invention, an image display unit includes a display panel configured to display an image, a first light source disposed on a side of the display panel opposite a display surface of the display panel so as to face a reflecting surface of a light reflecting member, a second light source having spectrum selectivity different from that of the first light source, a light diffusing member configured to diffuse light rays emitted from the first and second light sources, and a light control member formed from a transparent material and disposed between the first light source and the light diffusing member so as to face the first light source and the light diffusing member. The light control member directs each of the light rays emitted from the first light source and the second light source in a predetermined direction. The second light source is disposed so as to face an outer peripheral surface of the light control member, and the light ray emitted from the second light source is directed by the light control member inside the light control member so as to be output towards the light diffusing member.

Accordingly, in the image display unit, the light ray emitted from the second light source is directed by the light control member so as to be output towards the light diffusing member together with the light ray emitted from the first light source.

As described above, according to the embodiment of the present invention, the surface light source device includes at least one first light source disposed so as to face a reflecting surface of a light reflecting member, a second light source having spectrum selectivity different from that of the first light source, a light diffusing member configured to diffuse light rays emitted from the first and second light sources, and a light control member formed from a transparent material and disposed between the first light source and the light diffusing member so as to face the first light source and the light diffusing member. The light control member directs each of the light rays emitted from the first light source and the second light source in a predetermined direction. The second light source is disposed so as to face an outer peripheral surface of the light control member, and the light ray emitted from the second light source is directed by the light control member inside the light control member so as to be output towards the light diffusing member.

Since the first light source and the second light source are disposed at different locations, the performance of the surface light source device can be improved without decreasing the use efficiency of light. In addition, since the second light source is disposed so as to face an outer peripheral surface of the light control member, the thickness of the surface light source device can be reduced.

According to the above-described embodiment, a plurality of the first light sources can be arranged in a predetermined direction, and a surface of the light control member facing the light diffusing member can have a first irregularity pattern in which a plurality of convex portions are continuously arranged in the direction in which the plurality of first light sources are arranged. The convex portion can have one of a substantially triangular shape in cross section and a parabolic outer shape. Accordingly, the light ray emitted from the first light source can be made incident on the light diffusing member so that uniform light is output from the light diffusing member.

According to the above-described embodiment, the thickness of the light diffusing member can be less than a thickness of the light control member. Accordingly, the occurrence of abnormal noise generated when the light diffusing member is deflected and is brought into contact with the light control member can be prevented.

According to the above-described embodiment, the second light source can be formed from one of a light-emitting diode, an electroluminescence device, and a cold cathode fluorescent lamp. Accordingly, the second light source can be selected from among a wide variety of light sources. A combination of a light source to be used for the first light source and a light source to be used for the second light source provides a variety of optical designs using the characteristics of the two types of light sources.

According to the above-described embodiment, a plurality of the first light sources can be arranged in a predetermined direction, and a surface of the light control member facing the light diffusing member can have a second irregularity pattern in which a plurality of concave portions are continuously or separately arranged in a direction perpendicular to the direction in which the plurality of first light sources are arranged. Each of the concave portions can be formed from a first slope surface and a second slope surface each inclined with respect to a plane that is perpendicular to an optical axis of the light ray emitted from the first light source to the light control member. Accordingly, the light ray emitted from the first light source can be directed in a direction towards the light diffusing member so that the light ray is output from the light diffusing member together with the light ray emitted from the first light source.

According to the above-described embodiment, the transparent material can be one of acrylate, polycarbonate, polystyrene, and glass. Accordingly, an appropriate material in accordance with the optical design of the surface light source device can be selected. In addition, the performance can be improved in accordance with the characteristics of the selected material.

According to the above-described embodiment, the light control member can have ultraviolet light inhibiting properties with respect to the light rays emitted from the first light source and the second light source. Accordingly, deterioration of the light control member can be prevented.

According to the above-described embodiment of the present invention, an image display unit includes a display panel configured to display an image, a first light source disposed on a side of the display panel opposite a display surface of the display panel so as to face a reflecting surface of a light reflecting member, a second light source having spectrum selectivity different from that of the first light source, a light diffusing member configured to diffuse light rays emitted from the first and second light sources, and a light control member formed from a transparent material and disposed between the first light source and the light diffusing member so as to face the first light source and the light diffusing member. The light control member directs each of the light rays emitted from the first light source and the second light source in a predetermined direction. The second light source is disposed so as to face an outer peripheral surface of the light control member, and the light ray emitted from the second light source is directed by the light control member inside the light control member so as to be output towards the light diffusing member.

Since the first light source and the second light source are disposed at different locations, the performance of the surface light source device can be improved without decreasing the use efficiency of light. In addition, since the second light source is disposed so as to face an outer peripheral surface of the light control member, the thickness of the image display unit can be reduced.

DESCRIPTION OF THE PREFERRED EMBODIMENTS

Various exemplary embodiments of a surface light source device and an image display unit of the present invention are described below with reference to the accompanying drawings.

In the exemplary embodiments described below, an image display unit according to the embodiment of the present invention is applied to a television receiver that displays an image on a liquid crystal panel. A surface light source device according to the embodiment of the present invention is applied to a surface light source device of the television receiver.

However, the scope of the present invention is not limited to the television receiver including a liquid crystal panel and a surface light source device included in the television receiver, but is applicable to image display units used for other types of television receiver and a personal computer and a variety of surface light source devices used in these television receiver and personal computer.

Figure 1:
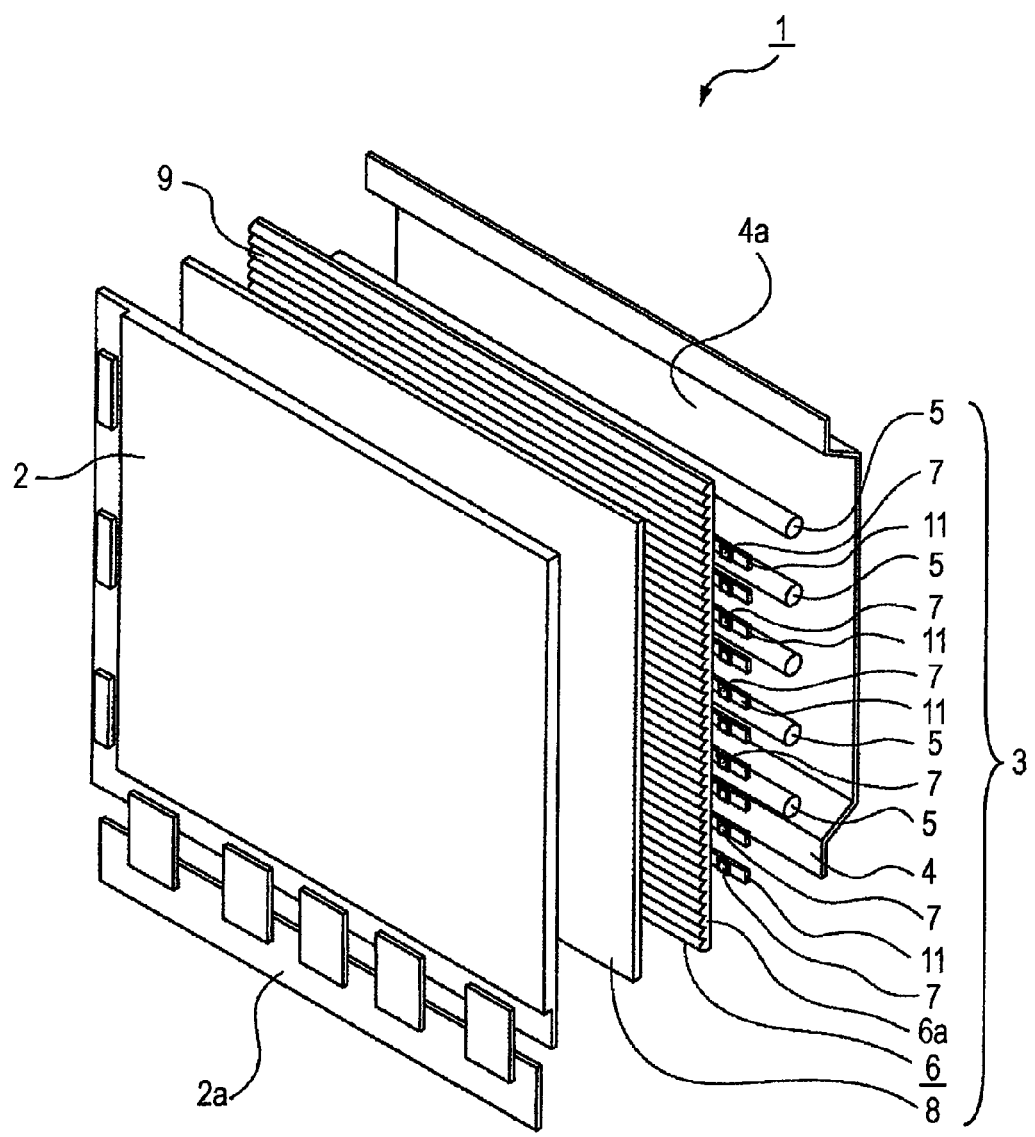
FIG. 1 is an exploded perspective view of an image display unit according to an exemplary embodiment of the present invention.

As shown in FIG. 1, an image display unit (a television receiver) 1 has a casing (not shown) including a variety of associated components disposed therein.

The casing has a box-like shape having a small thickness in the forward-backward direction. The casing has an opening on the front side thereof. A display panel (a liquid crystal panel) 2 is disposed inside the casing so as to close the opening. For example, the display panel 2 is formed by sandwiching a transmissive color liquid crystal panel with two polarizers. When being driven using an active matrix method, the display panel 2 can display a full-color image.

A driving circuit 2a is disposed, for example, beneath the display panel 2 and is electrically connected to the display panel 2. The driving circuit 2a drives and controls the display panel 2.

A surface light source device 3 is disposed inside the casing. The surface light source device 3 includes a light reflecting member 4, first light sources 5, 5, . . . , a light control member 6, second light sources 7, 7, . . . , and a light diffusing member 8 in this order from the back surface side of the image display unit 1. The light diffusing member 8 is disposed so as to face the display panel 2. The second light sources 7, 7, . . . are disposed on a side of the light control member 6.

For example, the light reflecting member 4 is formed from a white or silver resin or metal so as to have a plate-like shape. The light reflecting member 4 has a light reflecting surface 4a on the front side thereof.

The light reflecting member 4 reflects light rays emitted from the first light sources 5, 5, . . . towards the display panel 2. In order to increase the use efficiency of the light rays emitted from the first light sources 5, 5, . . . , it is desirable that the light reflecting member 4 has a reflectance of 90% or more.

The first light sources 5, 5, . . . are disposed so as to face the light reflecting surface 4a of the light reflecting member 4. CCFLs are used for the first light sources 5, 5, . . . . Each of the first light sources 5, 5, . . . has a horizontally long cylinder shape. The first light sources 5, 5, . . . are disposed so that the length directions thereof are the horizontal direction. The first light sources 5, 5, . . . are arranged at equal intervals in the vertical direction. Either end of each of the first light sources 5, 5, . . . in the length direction is supported by lamp sockets (not shown).

The first light sources 5, 5, . . . are not limited to CCFLs. For example, another type of light source, such as an LED, may be used for the first light sources 5, 5, . . . .

The light control member 6 is formed so as to have a rectangular thin plate shape. The light control member 6 is disposed between the light diffusing member 8 and the first light sources 5, 5, . . . . For example, the light control member 6 is made of a transparent material, such as acrylate, polycarbonate, polystyrene, or glass.

The light control member 6 leads light rays emitted from the first light sources 5, 5, . . . and the second light sources 7, 7, . . . towards the light diffusing member 8 in a predetermined direction. The light rays are made incident on the light diffusing member 8 so that the amount of light emitted from the light diffusing member 8 to the display panel 2 is made uniform. As used herein, the term "making the amount of light uniform" refers to emitting a uniform amount of light from the entire surface of the exit surface of the light diffusing member 3.

The light control member 6 can have a small amount of deflection when the image display unit 1 is inclined. In order to have sufficient rigidity, it is desirable that the thickness of the light control member 6 is 1 mm or more in the case that the display panel 2 has a size of 32 inches.

The light control member 6 has ultraviolet light inhibiting properties. The light rays emitted from the first light sources 5, 5, . . . includes an ultraviolet component of light. Accordingly, by providing the ultraviolet light inhibiting properties to the light control member 6, the deterioration of the light control member 6 can be prevented.

In addition, since the light control member 6 has ultraviolet light inhibiting properties, emission of ultraviolet light to outside the image display unit 1 can be prevented.

The light control member 6 has one surface facing the light diffusing member 8. This surface is formed so as to have a first irregularity pattern 9. In addition, the light control member 6 has the other surface facing the first light sources 5, 5, . . . . This surface is formed so as to have a second irregularity pattern 10.

In the first irregularity pattern 9, convex portions 9a, 9a, . . . are sequentially formed in a direction in which the first light sources 5, 5, . . . are arranged (in the vertical direction).

As described below, light rays emitted from the first light sources 5, 5, . . . and the second light sources 7, 7, . . . are made incident on the light control member 6. The inner surfaces of the first irregularity pattern 9 reflect some of the light rays made incident from the first light sources 5, 5, . . . so as to direct the light rays towards the light reflecting member 4. By reflecting the light rays using the inner surfaces of the first irregularity pattern 9, the amount of light emitted straight to the front of the first light sources 5, 5, . . . can be reduced.

Figure 3:
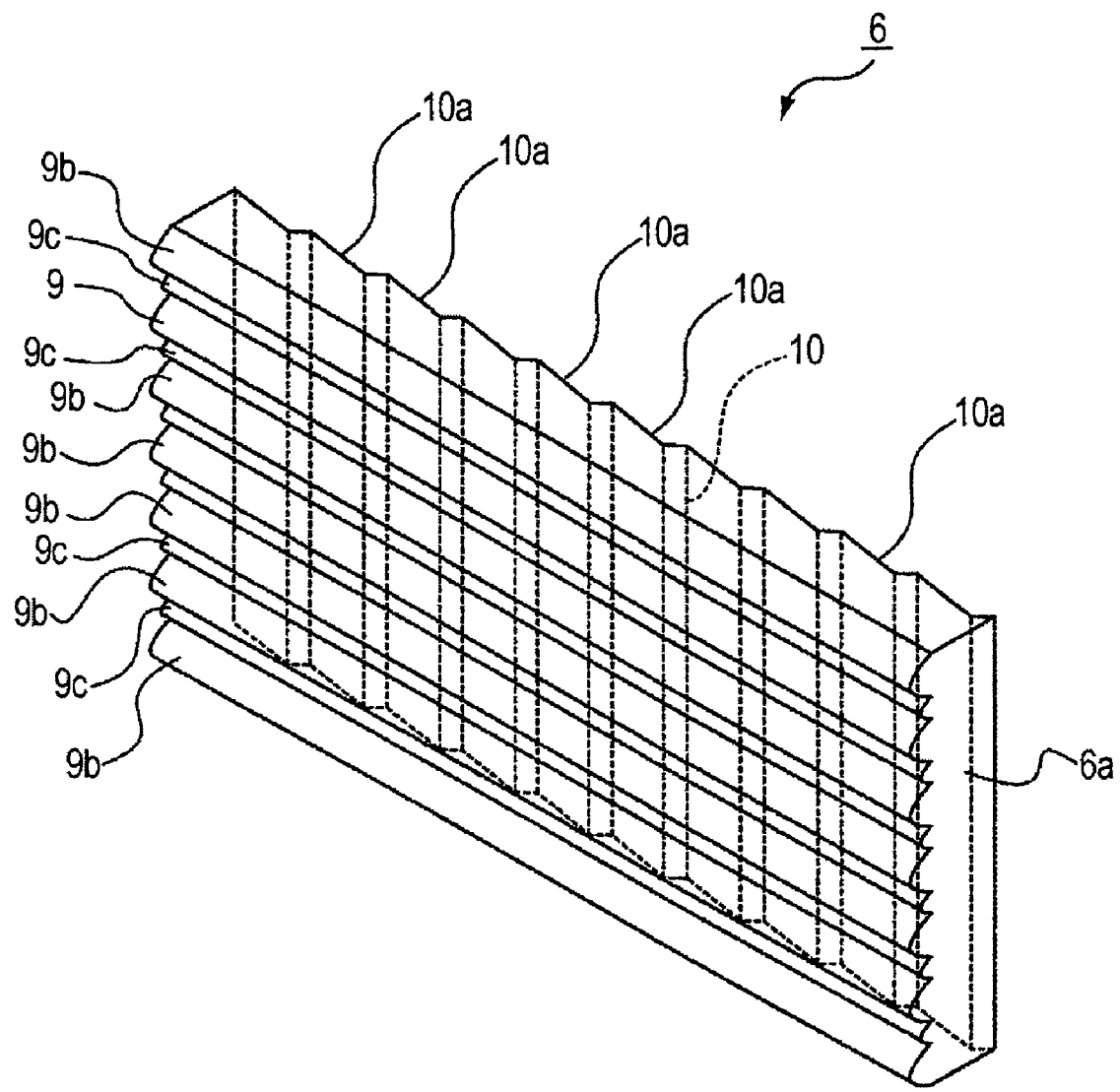
FIG. 3 is an enlarged perspective view of an example of a light control member according to the exemplary embodiment of the present invention.
Figure 4:
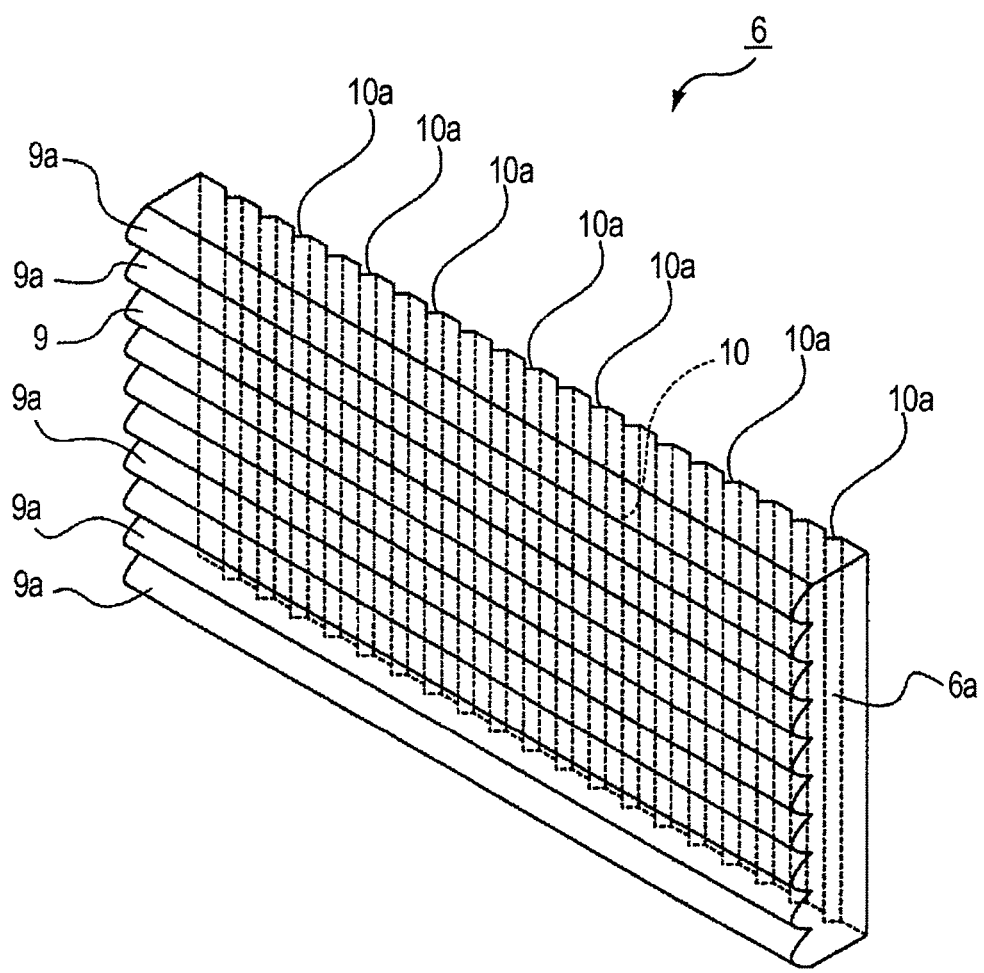
FIG. 4 is a schematic illustration of the shape of the light control member according to the exemplary embodiment of the present invention.

Each of the convex portions 9a, 9a, . . . has a substantially triangular shape in cross section or a parabolic outer shape (refer to FIGS. 3 and 4). The shape of the convex portion 9a can be determined using the distance between each of the first light sources 5, 5, . . . and the light control member 6 and the distance between the first light sources 5. For example, in order to increase the probability of the occurrence of inner reflection, it is desirable that the shape of the convex portions 9a, 9a, . . . has an outer surface curve having a tangential line that forms an angle of about 45° with respect to the direction in which the first light sources 5, 5, ... are arranged, as shown in FIG. 4.

However, the cross-sectional shape and the outer shape of the convex portion 9a are not limited to a triangular shape and a parabolic shape, respectively. For example, the shape may be the shape of part of an ellipse. Alternatively, the shape may be a combination of a substantially triangular shape, a parabolic shape, and the shape of part of an ellipse. For example, the following shape may be employed: a shape in which a substantially triangular shape and a parabolic shape are alternately and repeatedly arranged in a direction in which the first light sources 5, 5, ... are arranged.

Figure 5:
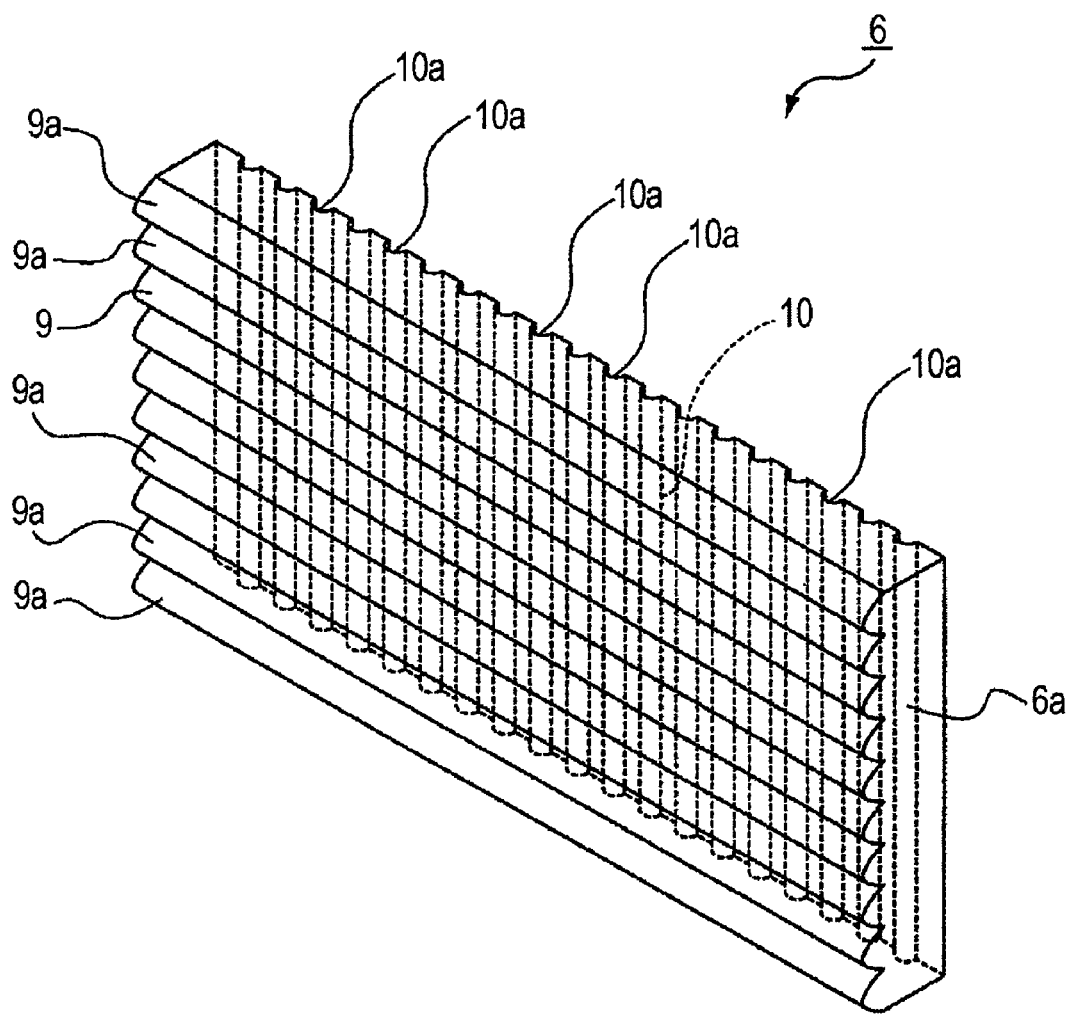
FIG. 5 is an enlarged perspective view of a different example of a light control member according to the exemplary embodiment of the present invention.
Figure 6:
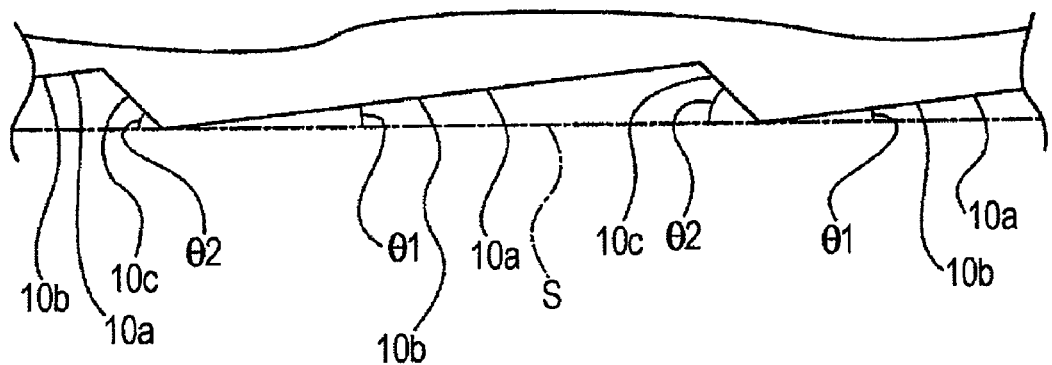
FIG. 6 is an enlarged perspective view of a different example of a light control member according to the exemplary embodiment of the present invention.
Figure 7:
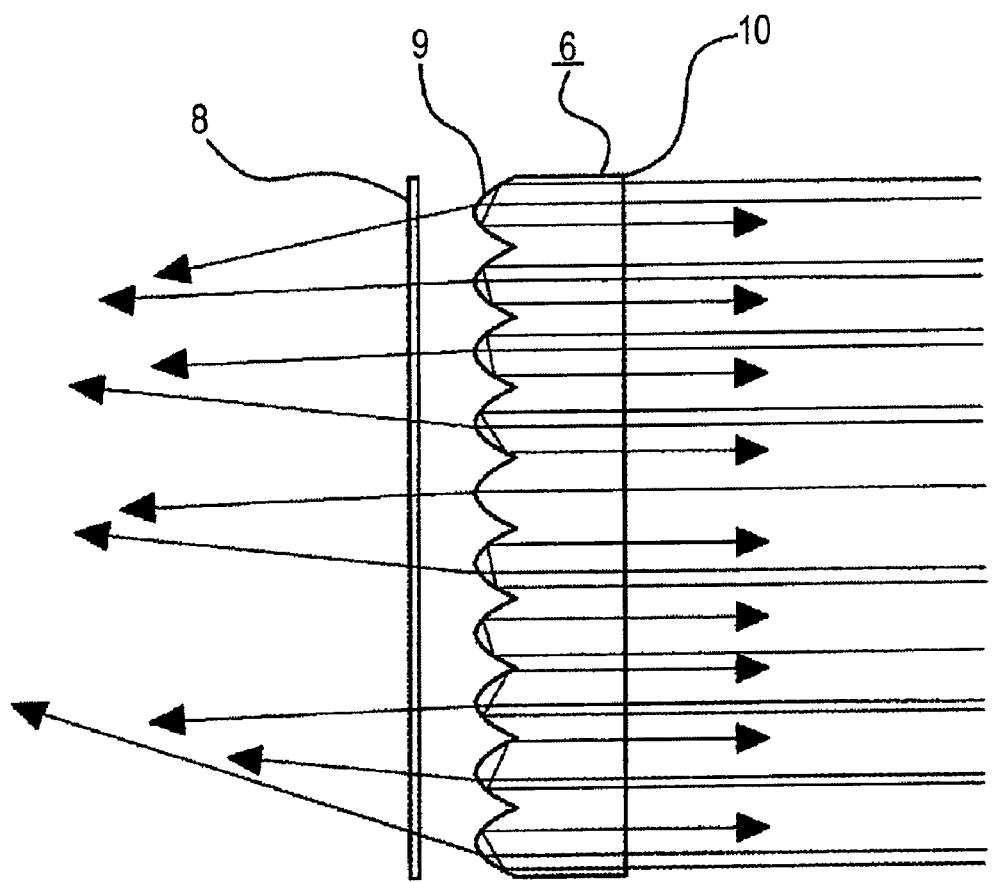
FIG. 7 is an enlarged perspective view of a different example of a light control member according to the exemplary embodiment of the present invention.

In addition, as shown in FIG. 5, the first irregularity pattern 9 may include a sub-pattern that is repeatedly arranged in a direction in which the first light sources 5, 5, ... are arranged, where the sub-pattern is a combination of a large convex portion 9b and a small convex portion 9c.

By alternately arranging the convex portion 9b and the convex portion 9c that have different heights so as to form the first irregularity pattern 9 in this manner, the light diffusing member 8 disposed in front of the light control member 6 is rarely brought in contact with the small convex portion 9c of the first irregularity pattern 9. Therefore, the possibility of damaging the light control member 6 and the light diffusing member 8 can be reduced.

The second irregularity pattern 10 of the light control member 6 includes concave portions 10a, 10a, ... continuously or separately formed in a direction in which the first light sources 5, 5, ... are arranged (refer to FIGS. 3, 5, 6, and 7).

In the light control member 6, the light emitted from the second light sources 7, 7, ... disposed on the side of the light control member 6 is directed in a direction perpendicular to the thickness direction of the light control member 6. The second irregularity pattern 10 has a function of outputting that light towards the light diffusing member 8. That is, the second irregularity pattern 10 receives the light emitted from the second light sources 7, 7, ... and delivers to the light diffusing member 8.

Each of the concave portions 10a of the second irregularity pattern 10 is formed so as to have a triangular shape (refer to FIGS. 3 and 6) or a semicircular shape (refer to FIG. 7) in cross section.

Figure 8:
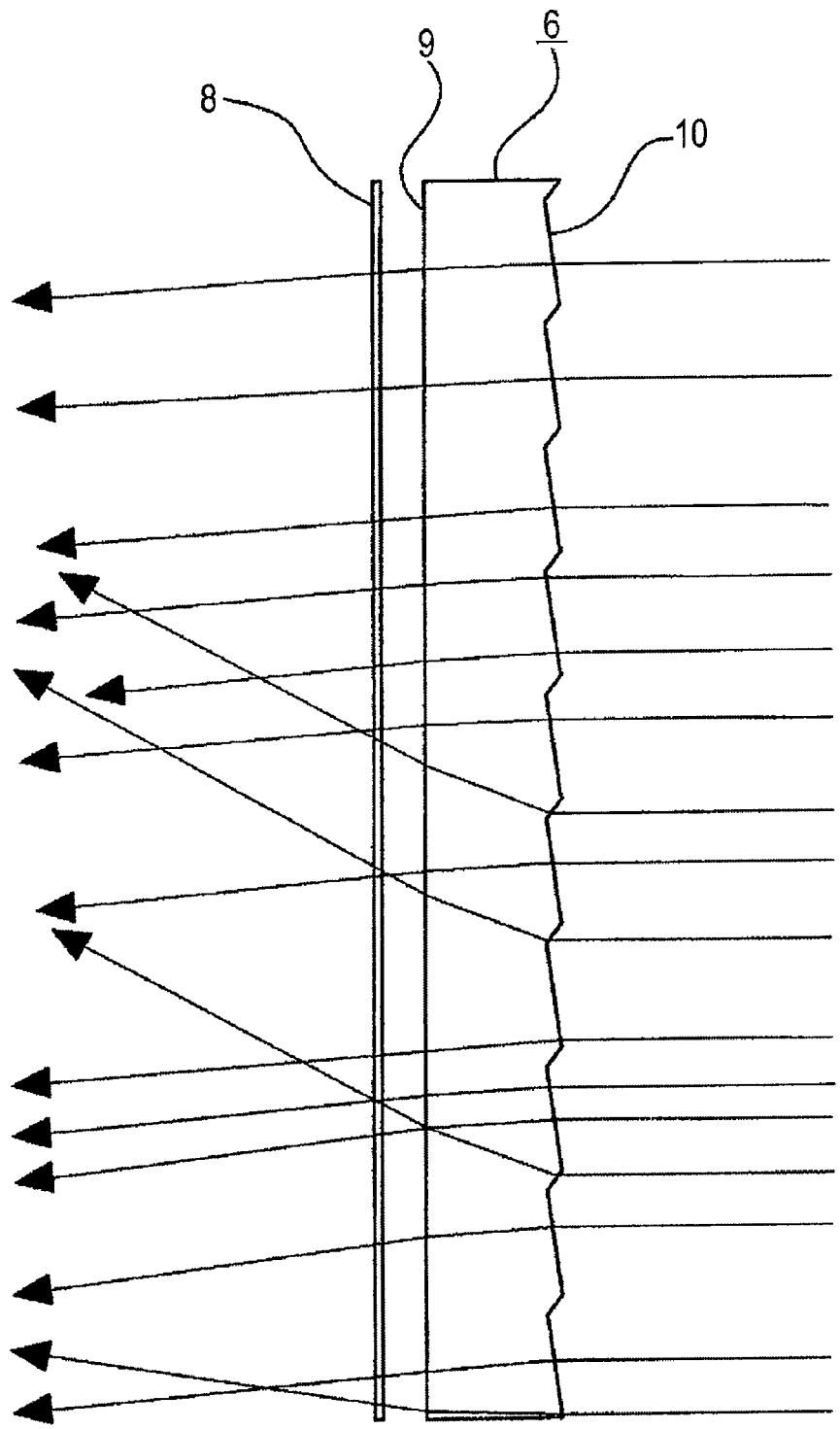
FIG. 8 is a schematic illustration of a second irregularity pattern of the light control member according to the exemplary embodiment of the present invention.

For example, as shown in FIG. 8, the concave portion 10a having a triangular cross section is formed from a first slope surface 10b and a second slope surface 10c. Each of the first slope surface 10b and the second slope surface 10c is inclined with respect to a plane S that is perpendicular to the optical-axis direction of light emitted from the first light sources 5, 5, ... to the light control member 6 (i.e., a forward-backward direction).

For example, a slope angle θ1 of the first slope surface 10b with respect to the plane S is set to about 2°, and a slope angle θ2 of the second slope surface 10c with respect to the plane S is set to about 45°. By forming the concave portion 10a from the first slope surface 10b having a slope angle of θ1 and the second slope surface 10c having a slope angle of θ2, the light emitted from the second light sources 7, 7, ... can be efficiently emitted to the light diffusing member 8. Thus, the efficiency of retrieving the light emitted from the second light sources 7, 7, ... can be improved.

In addition, the light emitted from the first light sources 5, 5, ... passes through the light control member 6. By forming the concave portion 10a from the first slope surface 10b having a slope angle of θ1 and the second slope surface 10c having a slope angle of θ2 in such a manner, the angle of refraction and the amount of refracted light can be decreased when the light emitted from the first light sources 5, 5, ... passes through the light control member 6. Accordingly, the effect of the light control member 6 on the light emitted from the first light sources 5, 5, ... can be reduced.

It should be noted that the cross-sectional shape of the concave portion 10a is not limited to a triangular shape or a semicircular shape. For example, any shape that can efficiently emit the light emitted from the second light sources 7, 7, ... towards the light diffusing member 8 can be employed. However, a shape that can reduce the effect on the light emitted from the first light sources 5, 5, ... is desirable.

In addition, in order to make the amount of light emitted from the light diffusing member 8 towards the display panel 2 uniform, the efficiency of retrieving light by the light control member 6 can be increased with distance from the second light sources 7, 7, .... In order to increase the efficiency of retrieving light by the light control member 6 with distance from the second light sources 7, 7, ..., the formation density of the concave portions 10a, 10a, ... of the second irregularity pattern 10 can be increased with distance from the second light sources 7, 7, ..., for example. Alternatively, the depths of the concave portions 10a, 10a, ... may be increased with distance from the second light sources 7, 7, .... Alternatively, the slope angles θ1 of the first slope surfaces 10b, 10b, ... and the slope angles θ2 of the second slope surfaces 10c, 10c, ... of the concave portions 10a, 10a, ... may be changed with distance from the second light sources 7, 7, ....

Figure 2:
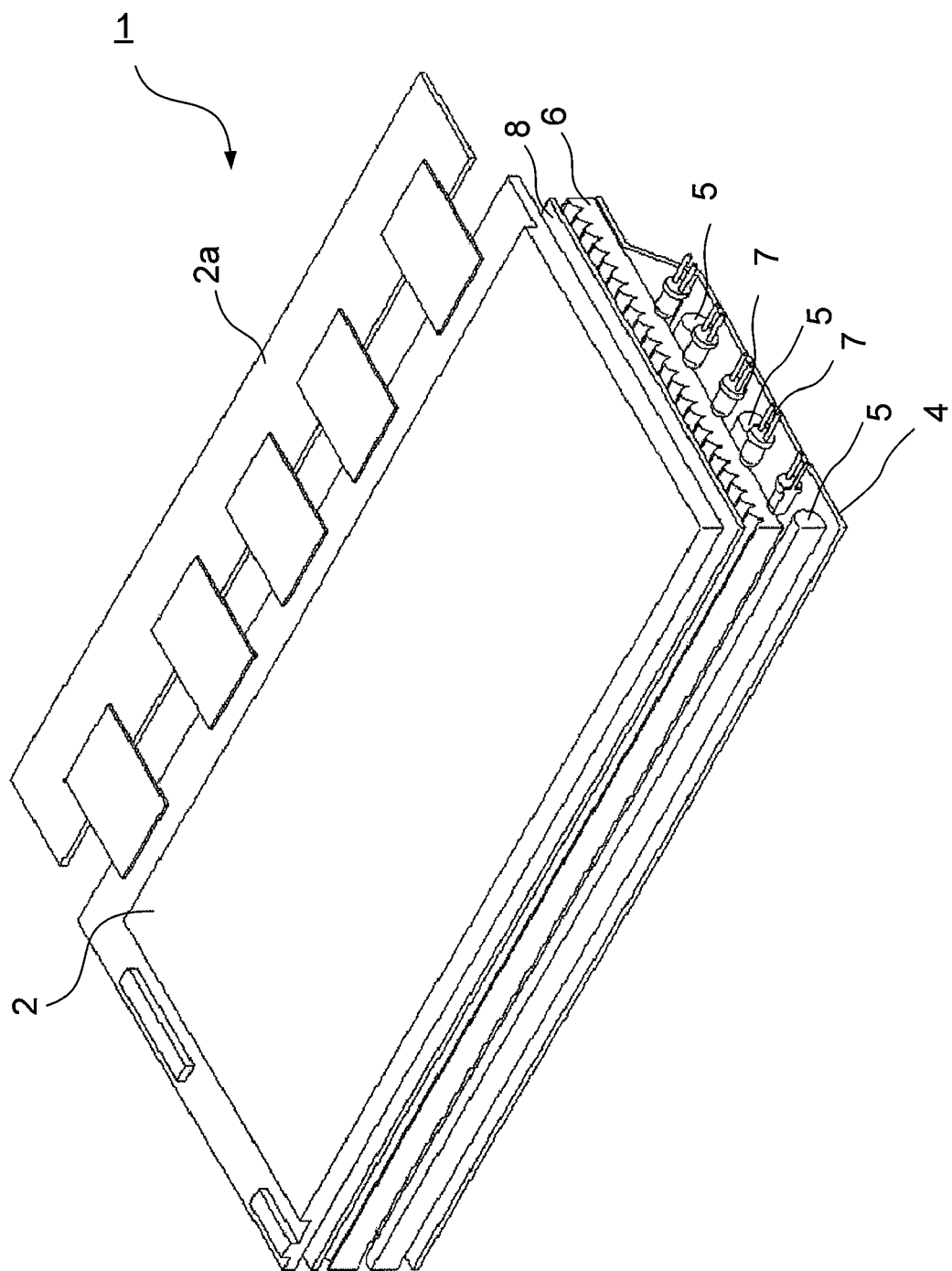
FIG. 2 is a perspective view of the image display unit of FIG. 1 according to an exemplary embodiment of the present invention.

The second light sources 7, 7, ... are disposed so as to face one of side surfaces (an outer peripheral surface) 6a of the light control member 6, as illustrated in FIG. 2. The second light sources 7, 7, ... are separately arranged along a length direction of the side surface 6a. Note that the outer peripheral surface of the light control member 6 includes four of the side surfaces 6a. The second light sources 7, 7, ... have a spectral sensitivity different from that of the first light sources 5, 5, .... For example, LEDs are used for the second light sources 7, 7, ....

Note that any light source having a spectral sensitivity different from that of the first light sources 5, 5, ... can be used for the second light sources 7, 7, .... For example, electroluminescence devices, cold cathode fluorescent lamps, hot cathode fluorescent lamps, or xenon lamps having spectral sensitivities different from the spectral sensitivity of the first light sources 5, 5, ... can be used for the second light sources 7, 7, ....

In this way, by using electroluminescence devices or cold cathode fluorescent lamps having spectral sensitivities different from the spectral sensitivity of the first light sources 5, 5, ... for the second light sources 7, 7, ..., a larger variety of light sources can be used for the second light sources 7, 7, .... A combination of a light source to be used for the first light sources 5, 5, ... and a light source to be used for the second light sources 7, 7, ... provides a variety of optical designs using the characteristics of the two light sources.

In particular, when electroluminescence devices are used for the second light sources 7, 7, ..., the performance the same as that provided in the case of LEDs are used for the second light sources 7, 7, ... can be obtained.

The light emitted from the second light sources 7, 7, ... enters the light control member 6 through one of the side surfaces 6a (e.g., a left side surface 6a). The light is directed so as to move away from the second light sources 7, 7, ... in the light control member 6. In addition, the light is internally reflected by the second irregularity pattern 10 and is directed towards the first irregularity pattern 9. Accordingly, the light control member 6 functions as a light guiding unit that directs light emitted from the second light sources 7, 7, . . . in a predetermined direction.

For example, each of the second light sources 7, 7, . . . is disposed on a corresponding one of substrates 11, 11, . . . , each having a driving circuit of the light source 7 (refer to FIG. 3).

The light diffusing member 8 is disposed between the light control member 6 and the display panel 2. The light diffusing member 8 diffuses the light emitted from the first light sources 5, 5, . . . and the light emitted from the second light sources 7, 7, . . . .

In order to eliminate the directivity of light emitted from the light control member 6, the light diffusing member 8 can have sufficient diffusivity and a low light absorption ratio. In order to have such a characteristic, the light diffusing member 8 is formed by dispersing transparent fine particles into a base material. The fine particles have the index of refraction different from that of the base material. Polystyrene is used for the base material. For example, silicon or acrylic is used for the material of the transparent fine particles.

The thickness of the light diffusing member 8 is smaller than that of the light control member 6. The rigidity of the light diffusing member 8 is lower than that of the light control member 6. For example, when polystyrene is used for the base material, the thickness of the light diffusing member 8 is set to 0.8 mm or less and, more desirably, 0.5 mm or less.

By setting the thickness of the light diffusing member 8 to be less than that of the light control member 6 and setting the rigidity of the light diffusing member 8 to be lower than that of the light control member 6, the occurrence of abnormal noise generated when, for example, the vibration of a speaker deflects the light diffusing member 8, and the light diffusing member 8 is brought into contact with the light control member 6 can be prevented.

In the surface light source device 3 having such a structure, when light is emitted from the first light sources 5, 5, . . . , the emitted light is made incident on the light control member 6. Thereafter, the light is separated into light passing through the light control member 6 and light reflected by the inner surfaces of the first irregularity pattern 9 and traveling towards the light reflecting member 4. The light that has passed through the light control member 6 is diffused by the light diffusing member 8 and travels towards the display panel 2. Thereafter, the light is emitted to the display panel 2 so as to serve as backlight. In contrast, the light traveling towards the light reflecting member 4 is reflected by the light reflecting member 4 and is made incident on the light control member 6 again. Thereafter, the light is diffused by the light diffusing member 8 and travels towards the display panel 2. Subsequently, the light is emitted to the display panel 2 so as to serve as backlight.

In addition, when light is emitted from the second light sources 7, 7, . . . , the emitted light is made incident on the light control member 6. The light is then directed towards a direction perpendicular to the thickness direction of the light control member 6. Thereafter, the light is reflected by the inner surfaces of the second irregularity pattern 10 of the light control member 6 and travels towards the first irregularity pattern 9. The light traveling towards the first irregularity pattern 9 is separated into light passing through the light control member 6 and light reflected by the inner surfaces of the first irregularity pattern 9 and traveling towards the light reflecting member 4. The light that has passed through the light control member 6 is diffused by the light diffusing member 8 and travels towards the display panel 2. Thereafter, the light is emitted to the display panel 2 so as to serve as backlight. In contrast, the light traveling towards the light reflecting member 4 is reflected by the light reflecting member 4 and is made incident on the light control member 6 again. Thereafter, the light is diffused by the light diffusing member 8 and travels towards the display panel 2. Subsequently, the light is emitted to the display panel 2 so as to serve as backlight.

Figure 9:
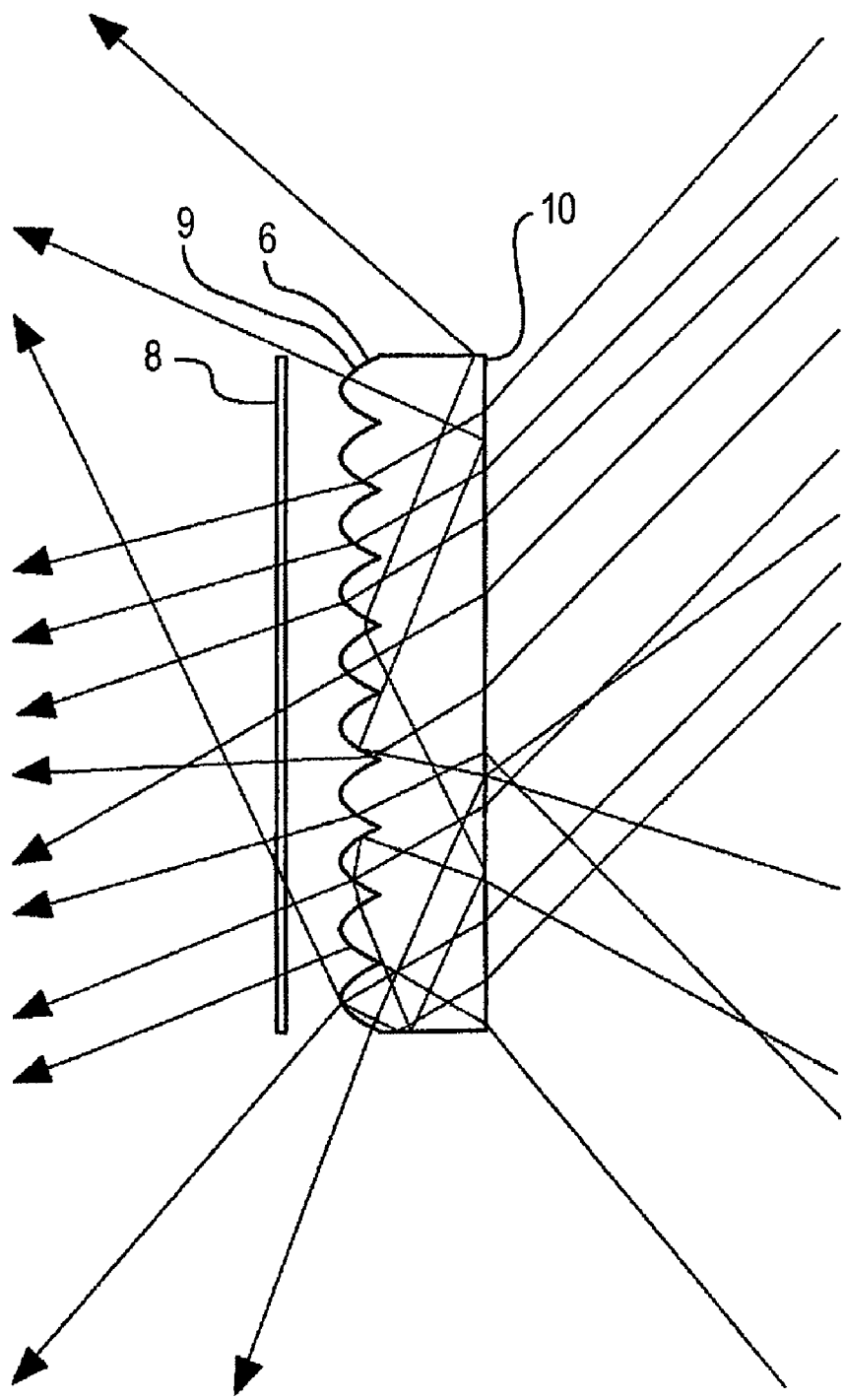
FIG. 9 illustrates a light path viewed in one of the directions when light is emitted straightforward from a first light source and is made incident on the light control member according to the exemplary embodiment of the present invention.
Figure 10:
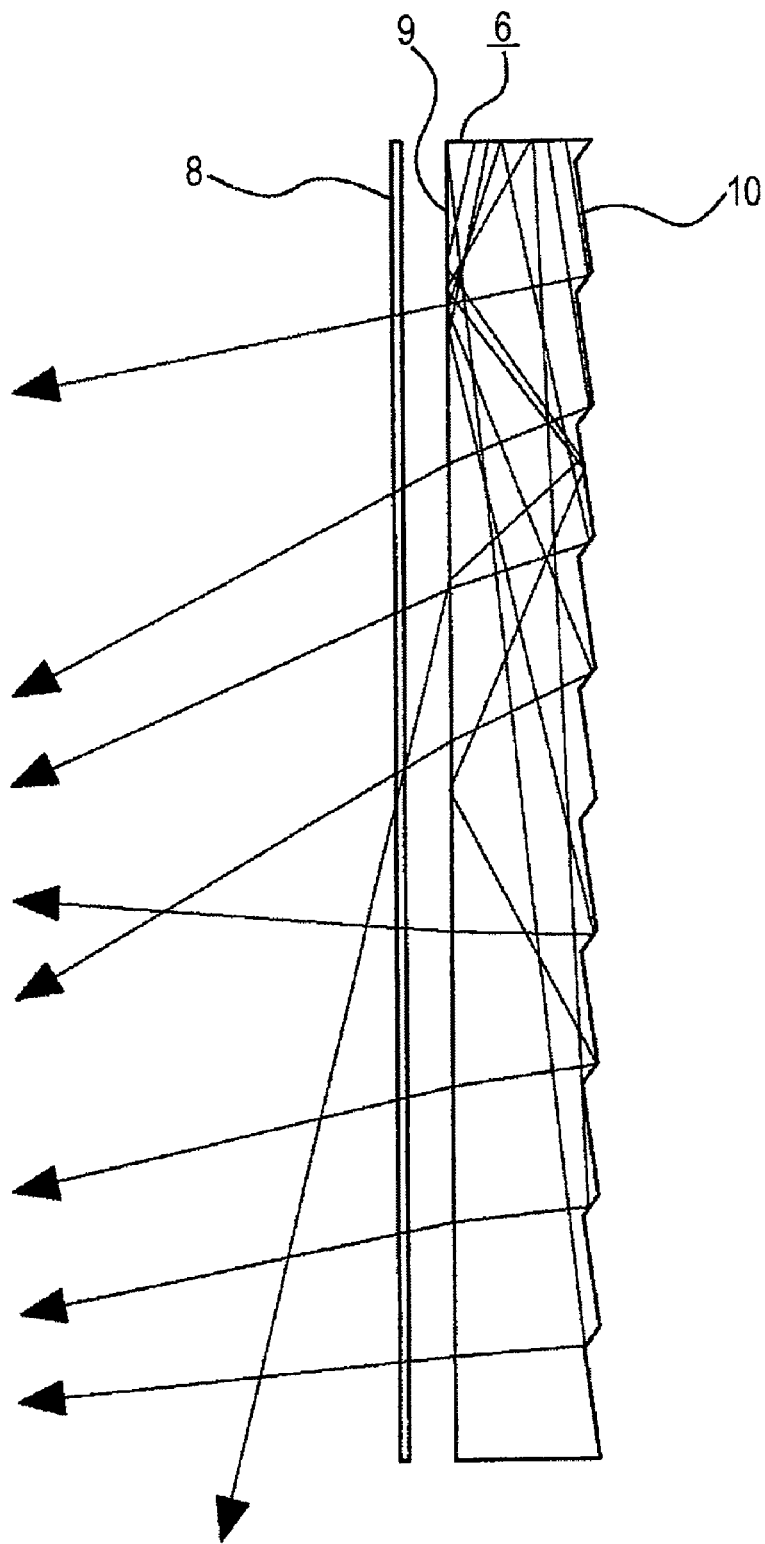
FIG. 10 illustrates the light path viewed in a direction perpendicular to the direction of FIG. 9 FIG. 8.

The path of light emitted straightforward from the first light sources 5, 5, . . . and made incident on the light control member 6 is described next with reference to FIGS. 9 and 10. FIG. 9 illustrates the light path viewed in the length direction of the first light sources 5, 5, . . . . FIG. 10 illustrates the light path viewed in a direction perpendicular to the length direction of the first light sources 5, 5, . . . .

As shown in FIGS. 9 and 10, the light emitted straightforward from the first light sources 5, 5, . . . has a high possibility of being reflected by the inner surfaces of the first irregularity pattern 9, and therefore, the amount of light traveling towards the light reflecting member 4 is large. The light traveling towards the light reflecting member 4 is reflected by the light reflecting member 4 and is made incident on the light control member 6 again. In addition, the effect of the second irregularity pattern 10 of the light control member 6 on the light emitted from the first light sources 5, 5, . . . is small.

Figure 11:
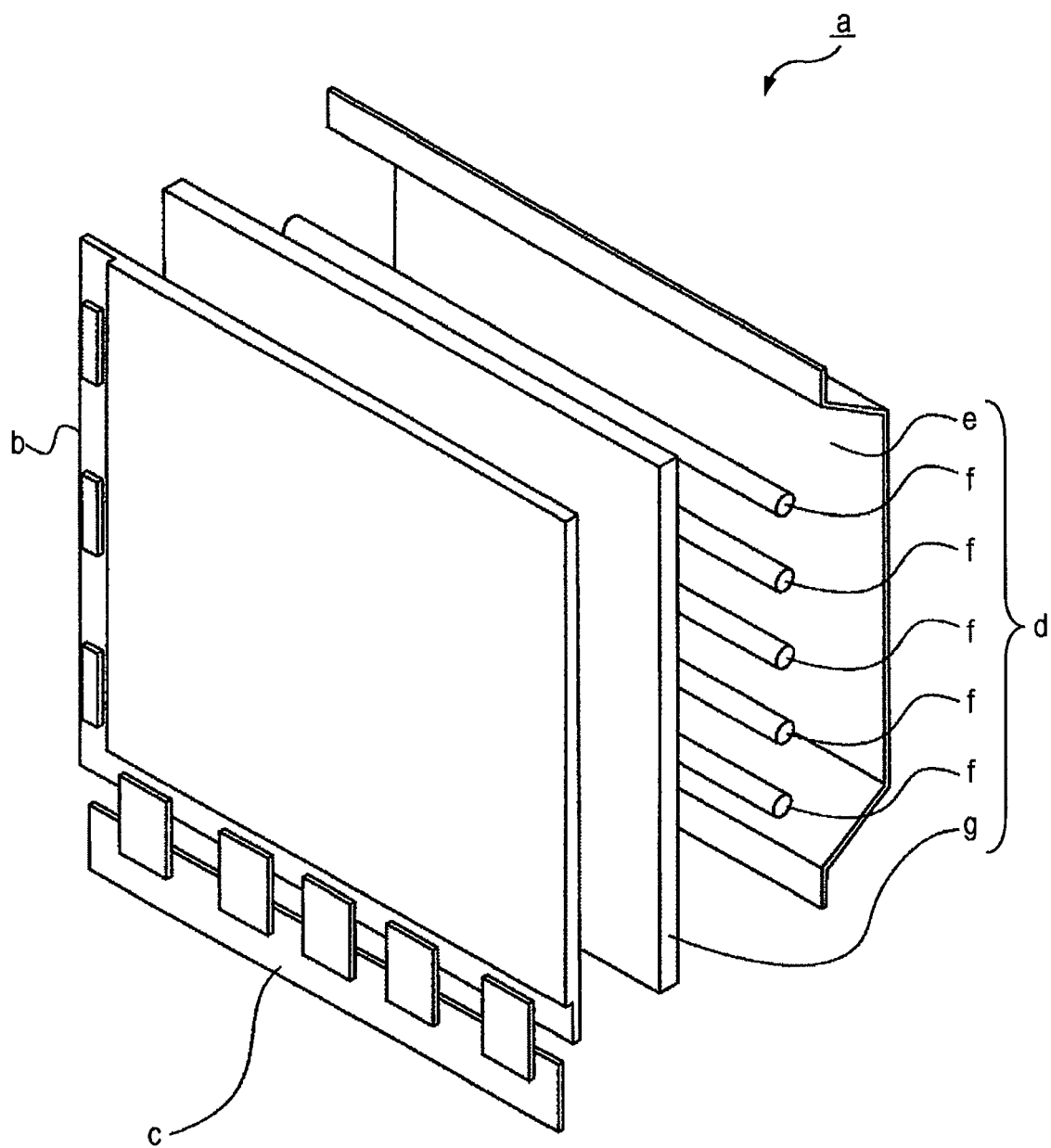
FIG. 11 illustrates a light path when light is emitted from the first light source and is made on the light control member at an angle of 45 degrees.

The path of light emitted from the first light sources 5, 5, . . . at an angle of 45 degrees with respect to the light control member 6 and made incident on the light control member 6 is described next with reference to FIG. 11. FIG. 11 illustrates the light path viewed in the length direction of the first light sources 5, 5, . . . .

As shown in FIG. 11, the light emitted from the first light sources 5, 5, . . . at an angle of 45 degrees has a high possibility of passing through the light control member 6, and therefore, the amount of light traveling towards the light reflecting member 4 is small.

Figure 12:
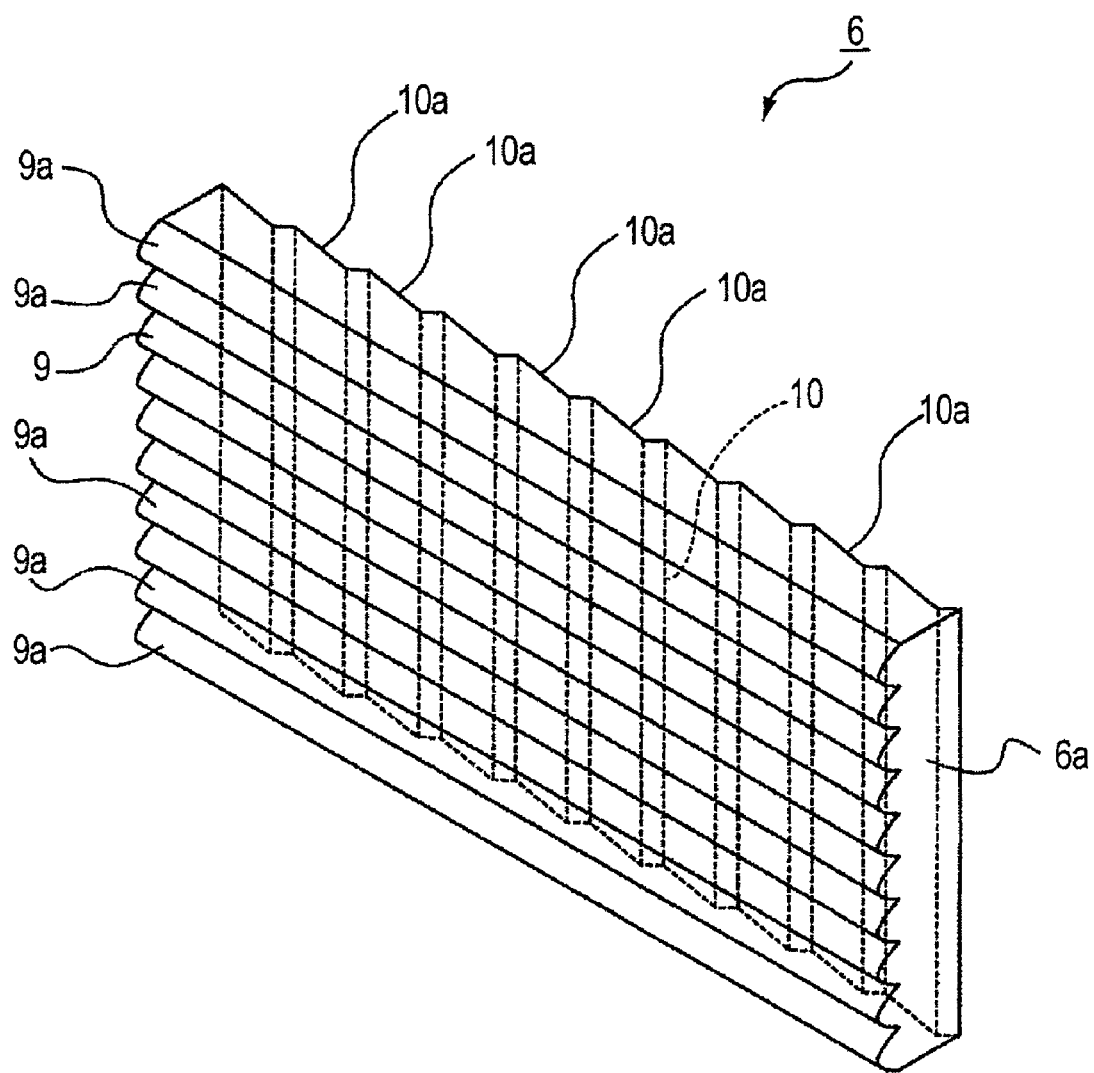
FIG. 12 illustrates a light path when light is emitted from a second light source and is made incident on the light control member.
Figure 13:
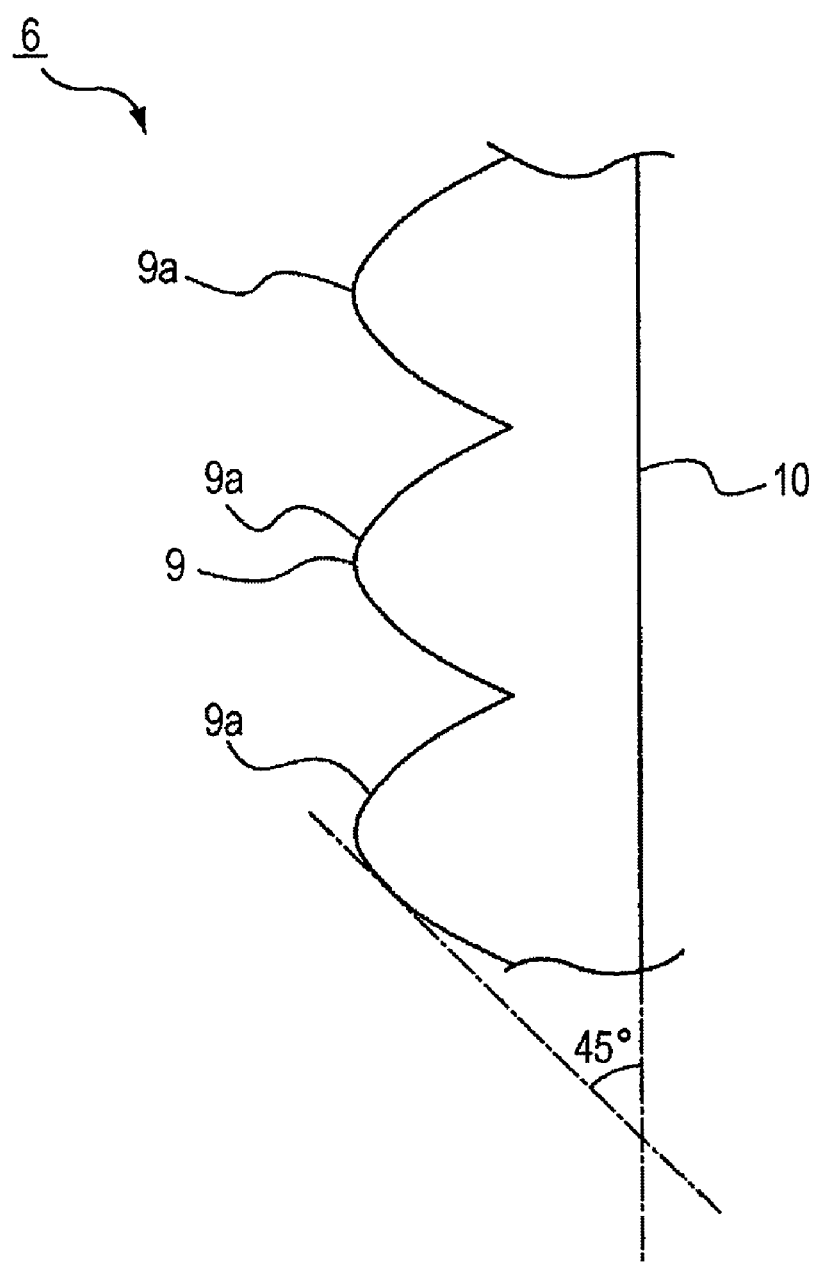
FIG. 13 is an exploded perspective view of an existing image display unit.

The path of light emitted from the second light sources 7, 7, . . . to the light control member 6 and, subsequently, made incident on the light control member 6 is described next with reference to FIG. 12. FIG. 12 illustrates the light path viewed in the length direction of the first light sources 5, 5, . . . .

As shown in FIG. 12, the light emitted from the second light sources 7, 7, . . . is directed inside the light control member 6 in a direction perpendicular to the thickness direction of the light control member 6. At that time, the light that reaches the first irregularity pattern 9 is reflected by the inner surfaces of the first irregularity pattern 9 and is directed in a direction away from the second light sources 7, 7, . . . . The light that reaches the second irregularity pattern 10 is reflected by the inner surfaces of the second irregularity pattern 10 and passes through the first irregularity pattern 9. The light then travels towards the light diffusing member 8.

As described above, the image display unit 1 includes the first light sources 5, 5, . . . disposed so as to face the light reflecting surface 4a of the light reflecting member 4, the second light sources 7, 7, . . . having a spectral sensitivity different from that of the first light sources 5, 5, . . . , the light diffusing member 8 that diffuses the light emitted from the first light sources 5, 5, . . . and the light emitted from the second light sources 7, 7, . . . , and the light control member 6 that directs the light emitted from the first light sources 5, 5, . . . towards a predetermined direction and the light emitted from the second light sources 7, 7, . . . towards a predetermined direction. The second light sources 7, 7, . . . are disposed so as to face the side surface 6a of the light control member 6. In this way, the light emitted from the second light sources 7, 7, . . . is directed in a direction perpendicular to the thickness direction of the light control member 6 and is output towards the light diffusing member 8 by the light control member 6.

Accordingly, since the first light sources 5, 5, . . . and the second light sources 7, 7, . . . are disposed at different locations, the performance can be improved without decreasing the use efficiency of light. In addition, since the second light sources 7, 7, . . . are disposed so as to face the side surface 6a of the light control member 6, the thickness of the surface light source device 3 can be reduced.

By disposing the light control member 6 so as to face the light diffusing member 8 regardless of the locations of the first light sources 5, 5, . . . and the second light sources 7, 7, . . ., an excellent performance for controlling the light can be maintained, and the thickness of the image display unit 1 can be reduced.

In addition, in the image display unit 1, the surface of the light control member 6 facing the light diffusing member 8 is formed so as to serve as the first irregularity pattern 9. Furthermore, the cross-sectional shape of the convex portion 9a (9b and 9c) of the first irregularity pattern 9 is formed so as to be substantially triangular, or the outer shape of the convex portion 9a (9b and 9c) of the first irregularity pattern 9 is formed so as to be parabolic. Accordingly, the light emitted from the first light sources 5, 5, . . . can be made incident on the light diffusing member 8 so that the light is uniformly emitted from the light diffusing member 8 to the display panel 2.

Furthermore, in the image display unit 1, the surface of the light control member 6 facing the first light sources 5, 5, . . . is formed so as to serve as the second irregularity pattern 10. Each of the concave portions 10a, 10a, . . . of the second irregularity pattern 10 is formed by the first slope surface 10b and the second slope surface 10c inclined with respect to the plane S that is perpendicular to the optical axis of the light emitted from the first light source 5 to the light control member 6. Accordingly, the light emitted from the second light sources 7, 7, . . . can be directed towards the light diffusing member 8 and be emitted to the display panel 2 together with the light emitted from the first light sources 5, 5, . . . .

Still furthermore, since one of acrylate, polycarbonate, polystyrene, and glass can be used for the material of the light control member 6, an appropriate material in accordance with the optical design of the surface light source device 3 can be selected. In addition, the performance can be improved in accordance with the characteristics of the selected material.

As described above, by using cold cathode fluorescent lamps for the first light sources 5, 5, . . . and using LEDs for the second light sources 7, 7, . . ., the color range of an image displayed on the display panel 2 can be increased, since the wavelengths of light emitted from the first light sources 5, 5, . . . and the second light sources 7, 7, . . . are different.

Yet still furthermore, when low power is supplied to a cold cathode fluorescent lamp, abnormal electrical discharge may occur. Accordingly, it is difficult to reduce the power to a value that makes the luminance of the screen zero. However, when an LED is used, the luminance of the screen can be reduced to substantially zero by supplying a low power. On the other hand, a cold cathode fluorescent lamp is cheaper than an LED. Accordingly, by using a cold cathode fluorescent lamp and an LED, the image display unit 1 can be produced at lower cost, as compared with the case where all of the light sources are LEDs.

Therefore, when cold cathode fluorescent lamps are used for the first light sources 5, 5, . . . and LEDs are used for the second light sources 7, 7, . . ., the power supplied to the first light sources 5, 5, . . . and the second light sources 7, 7, . . . can be changed in accordance with the optimal luminance of the screen. Thus, the image display unit 1 can be produced at low cost, the power consumption of the image display unit 1 can be reduced, and the controlled color range can be increased.

In addition, by shifting the wavelength of light emitted from the cold cathode fluorescent lamp from the wavelength of light emitted from the LED, any white point can be determined. For example, by using a red-based cold cathode fluorescent lamp and a blue-based LED and changing the light ray ratio between the cold cathode fluorescent lamp and the LED, any white point can be determined.

Furthermore, the lighting response speed of an LED is higher than that of a cold cathode fluorescent lamp. Accordingly, by using LEDs for the second light sources 7, 7, . . ., a slow response speed of a cold cathode fluorescent lamp can be compensated for when a cold cathode fluorescent lamp is turned on and off in synchronization with a vertical synchronizing signal. Thus, a clear image can be provided when using a blinking backlight method.

The blinking backlight method is a method for solving the following problem. In image display units (liquid crystal display units), backlight is used. Accordingly, the luminance is decreased in inverse proportion to the display time of black. In addition, the contrast is decreased. That is, in direct light structure in which cold cathode fluorescent lamps are disposed on the back surface side of a liquid crystal panel, the cold cathode fluorescent lamps are turned on at all times. Accordingly, when a belt-shaped black display area is scanned from the top to bottom of the display panel, the backlight for the black area is wasteful. Therefore, when a screen is displayed, the luminance of the cold cathode fluorescent lamps is increased, and the cold cathode fluorescent lamps located behind the belt-shaped black display area are turned off in synchronization with the movement of scanning of the black display area. By using such a blinking backlight method, the use efficiency of light can be increased. In the blinking backlight method, cold cathode fluorescent lamps are turned on and off so as to correspond to the image display area and the black display area, respectively. In this way, loss of light can be minimized, and improvement of the performance of displaying an image and improvement of the luminance and contrast are achieved at the same time.

While the foregoing embodiment has been described with reference to the structure in which the second light sources 7, 7, . . . are disposed so as to face only one of the side surfaces 6a of the light control member 6, the location of the second light sources 7, 7, . . . are not limited thereto. For example, the second light sources 7, 7, . . . can be disposed so as to face a plurality of the side surfaces 6a, 6a, . . ., for example, two facing side surfaces 6a and 6a.

By disposing the second light sources 7, 7, . . . so as to face a plurality of the side surfaces 6a, 6a, . . . in this manner, the number of the second light sources 7, 7, . . . can be increased, and therefore, the display luminance of the display panel 2 can be increased. Thus, a bright image can be generated.

In addition, mounting holes may be formed on the side surface 6a of the light control member 6, and the second light sources 7, 7, . . . may be disposed in the mounting holes. By disposing the second light sources 7, 7, . . . in the mounting holes, the distance between the light control member 6 and the second light sources 7, 7, . . . can be decreased, and therefore, the image display unit 1 can be reduced in size.

Furthermore, by disposing the second light sources 7, 7, . . . in the mounting holes, the positions of the second light sources 7, 7, . . . with respect to the light control member 6 can be precisely determined.

Still furthermore, for example, a sensor for monitoring the color of the light emitted from the second light sources 7, 7, . . . (the LEDs) may be disposed on the side surface 6a of the light control member 6 so that a function of correcting an age-related color registration error of the second light sources 7, 7, . . . is provided.

It should be understood by those skilled in the art that various modifications, combinations, sub-combinations and alterations may occur depending on design requirements and other factors insofar as they are within the scope of the appended claims or the equivalents thereof.

What is claimed is:

1. A surface light source device comprising:
   a first light source disposed so as to face a reflecting surface of a light reflecting member;
   a second light source having spectrum selectivity different from that of the first light source;
   a light diffusing member configured to diffuse light rays emitted from the first light source and the second light source; and
   a light control member formed from a transparent material and disposed between the first light source and the light diffusing member so as to face the first light source and the light diffusing member, the light control member directing the light rays emitted from the first light source and the second light source in a predetermined direction;
   wherein the light control member has a first side facing the light diffusing member, a second side facing the first light source in a direction opposite the light diffusing member, and one or more outer peripheral surfaces disposed laterally from the first and second sides;
   wherein the second light source is disposed so as to face at least one of the one or more outer peripheral surfaces of the light control member;
   wherein the second side of the light control member has an irregularity pattern; and
   wherein the light rays emitted from the second light source are directed by the light control member inside the light control member and are directed by the irregularity pattern towards the light diffusing member.

2. The surface light source device according to claim 1, wherein the first light source includes a plurality of first light sources arranged in a predetermined direction, and wherein the first side of the light control member facing the light diffusing member has another irregularity pattern in which a plurality of convex portions are continuously arranged in the direction in which the plurality of first light sources are arranged, and wherein the convex portion has one of a substantially triangular shape in cross section and a parabolic outer shape.

3. The surface light source device according to claim 1, wherein a thickness of the light diffusing member is less than a thickness of the light control member.

4. The surface light source device according to claim 1, wherein the second light source is formed from one of a light-emitting diode, an electroluminescence device, and a cold cathode fluorescent lamp.

5. The surface light source device according to claim 1, wherein the first light source includes a plurality of first light sources arranged in a predetermined direction, and wherein the irregularity pattern of the second side of the light control member facing the plurality of first light sources includes a plurality of concave portions arranged in a direction perpendicular to the direction in which the plurality of first light sources are arranged, and wherein each of the concave portions is formed from a first slope surface and a second slope surface each inclined with respect to a plane that is perpendicular to an optical axis of the light rays emitted from the first light source to the light control member.

6. The surface light source device according to claim 1, wherein the transparent material is one of acrylate, polycarbonate, polystyrene, and glass.

7. The surface light source device according to claim 1, wherein the light control member has ultraviolet light inhibiting properties with respect to the light rays emitted from the first and second light sources.

8. An image display unit comprising:
   a display panel configured to display an image;
   a first light source disposed on a side of the display panel opposite a display surface of the display panel so as to face a reflecting surface of a light reflecting member;
   a second light source having spectrum selectivity different from that of the first light source;
   a light diffusing member configured to diffuse light rays emitted from the first light source and the second light source; and
   a light control member formed from a transparent material and disposed between the first light source and the light diffusing member so as to face the first light source and the light diffusing member, the light control member directing the light rays emitted from the first light source and the second light source in a predetermined direction;
   wherein the light control member has a first side facing the light diffusing member, a second side facing the first light source in a direction opposite the light diffusing member, and one or more outer peripheral surfaces disposed laterally from the first and second sides;
   wherein the second side of the light control member has an irregularity pattern;
   wherein the second light source is disposed so as to face at least one of the one or more outer peripheral surfaces of the light control member; and
   wherein the light rays emitted from the second light source are directed by the light control member inside the light control member and are directed by the irregularity pattern towards the light diffusing member.

* * * * *